(12) United States Patent
Zhang et al.

(10) Patent No.: US 10,381,017 B2
(45) Date of Patent: Aug. 13, 2019

(54) METHOD AND DEVICE FOR ELIMINATING BACKGROUND SOUND, AND TERMINAL DEVICE

(71) Applicant: BAIDU ONLINE NETWORK TECHNOLOGY (BEIJING) CO., LTD, Beijing (CN)

(72) Inventors: Xuewei Zhang, Beijing (CN); Xiangang Li, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/044,707

(22) Filed: Jul. 25, 2018

(65) Prior Publication Data

US 2019/0103124 A1    Apr. 4, 2019

(30) Foreign Application Priority Data

Sep. 29, 2017 (CN) .......................... 2017 1 0910834

(51) Int. Cl.
*G10L 25/30* (2013.01)
*G10L 21/0208* (2013.01)
*G06N 3/08* (2006.01)
*G10L 15/20* (2006.01)

(52) U.S. Cl.
CPC .......... *G10L 21/0208* (2013.01); *G06N 3/08* (2013.01); *G10L 15/20* (2013.01); *G10L 25/30* (2013.01)

(58) Field of Classification Search
CPC .......... G10L 15/16; G10L 15/063; G06N 3/08
USPC ........................................ 704/202, 232, 259
See application file for complete search history.

(56) References Cited

U.S. PATENT DOCUMENTS

| 5,185,848 A | * | 2/1993 | Aritsuka | ................. G10L 15/16 704/202 |
| 2006/0031066 A1 | * | 2/2006 | Hetherington | ...... G10L 21/0208 704/226 |
| 2012/0010887 A1 | * | 1/2012 | Boregowda | ........... G10L 15/063 704/250 |
| 2015/0149165 A1 | * | 5/2015 | Saon | ..................... G10L 15/063 704/232 |

* cited by examiner

*Primary Examiner* — George C Monikang
(74) *Attorney, Agent, or Firm* — Hodgson Russ LLP

(57) ABSTRACT

The present disclosure provides a method and a device for eliminating background sound, and a terminal device. The method includes: obtaining an initial audio data set; performing background sound fusion processing on the initial audio data set to obtain training sample data; performing neural network training based on the training sample data and the initial audio data set to generate an initial neural network model for eliminating background sound; and performing background sound elimination on audio data to be processed based on the initial neural network model for eliminating background sound.

6 Claims, 3 Drawing Sheets

METHOD AND DEVICE FOR ELIMINATING BACKGROUND SOUND, AND TERMINAL DEVICE

CROSS-REFERENCE TO RELATED APPLICATION

This application claims priority to and benefits of Chinese Patent Application Serial No. 201710910834.X, filed with the State Intellectual Property Office of P. R. China on Sep. 29, 2017, the entire content of which is incorporated herein by reference.

FIELD

The present disclosure relates to a computer technology field, and more particularly to a method and a device for eliminating background sound, and a terminal device.

BACKGROUND

Generally, when people communicate with each other or interact with a machine via electronic communication device such as a mobile phone, an interphone, and the like, the interactions between the people are often in a noisy background environment. In this situation, sound obtained by the receiver not only includes the voice of the sender but also includes other sounds around the sender, such as voices of other people, sound of steps, collision sound of objects, music, sound of vehicles, and the like. These background sounds except the voice of the receiver and the sender may affect quality of communication. Eliminating the background sound is one of methods for improving the quality of communication.

SUMMARY

Embodiments of the present disclosure seek to solve at least one of the problems existing in the related art to at least some extent.

For this, embodiments of a first aspect of the present disclosure provide a method for eliminating background sound, including: obtaining an initial audio data set; performing background sound fusion processing on the initial audio data set to obtain training sample data; performing neural network training based on the training sample data and the initial audio data set to generate an initial neural network model for eliminating background sound; and performing background sound elimination on audio data to be processed based on the initial neural network model for eliminating background sound.

Embodiments of a second aspect of the present disclosure provide a device for eliminating background sound, including: an obtaining module, configured to obtain an initial audio data set; a first processing module, configured to perform background sound fusion processing on the initial audio data set to obtain training sample data; a first training module, configured to perform neural network training based on the training sample data and the initial audio data set to generate an initial neural network model for eliminating background sound; and a second processing module, configured to perform background sound elimination on audio data to be processed based on the initial neural network model for eliminating background sound.

Embodiments of a third aspect of the present disclosure provide a terminal device including a memory, a processor and a computer program executable on the processor and stored on the memory, when executed by the processor, causing the processor to implement the method for eliminating background sound according to any one of embodiments of the first aspect of the present disclosure.

Embodiments of a fourth aspect of the present disclosure provide a non-transitory computer readable storage medium, having a computer program thereon, wherein the computer program is configured to implement the method for eliminating background sound according to any one of embodiments of the first aspect of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
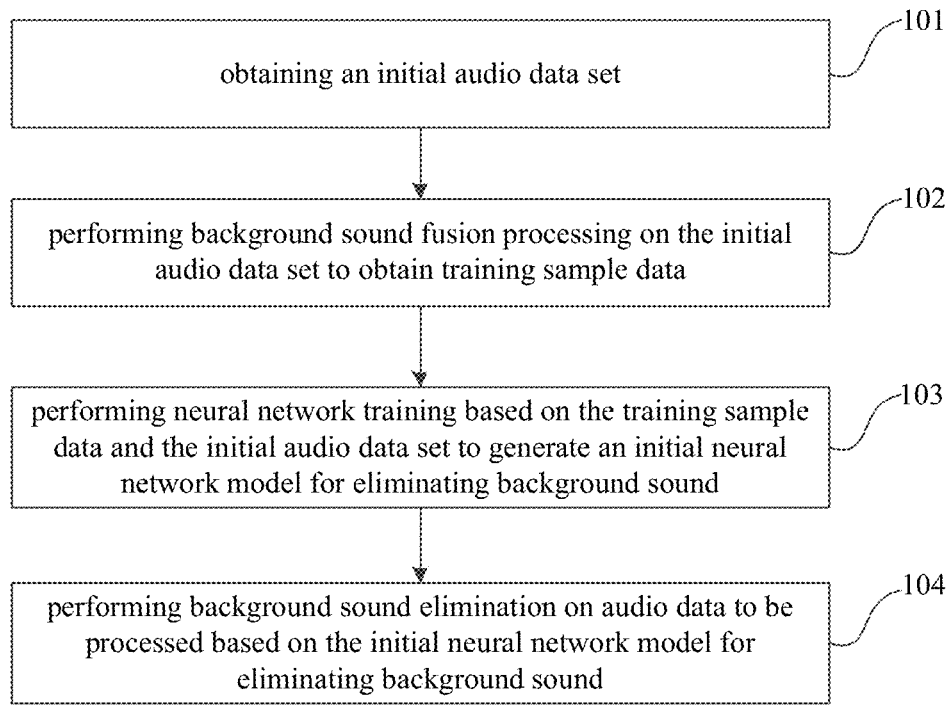
FIG. 1 is a flow chart of a method for eliminating background sound according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In detail, in the related art, the background sound may be eliminated via acoustic echo chancellor (AEC for short). Learning needs to be performed once whenever a sender is in a different scenario during eliminating background sound via the AEC, thus a way for eliminating the background sound is complex with high cost and poor user experience. Aims to solve this problem, embodiments of the present disclosure provide a method for eliminating background sound.

With the method for eliminating background sound according to embodiments of the present disclosure, after obtaining an initial audio data set, background sound fusion processing is firstly performed on the initial audio data set to obtain training sample data, then neural network training is performed based on the training sample data and the initial audio data set to generate an initial neural network model for eliminating background sound, and finally, background sound elimination is performed on audio data to be processed based on the initial neural network model for eliminating background sound. Thereby, it realizes eliminating background sound of the audio data to be processed by using a neural network model, improving calling quality. In addition, when the user is in a different scenario, no separate training is required to generate the neural network model, the implementation is simple, with low cost, and user experience is improved.

FIG. 1 is a flow chart of a method for eliminating background sound according to an embodiment of the present disclosure.

As illustrated in FIG. 1, the method for eliminating background sound including follows.

At block 101, an initial audio data set is obtained.

An executive subject of the method for eliminating background sound according to embodiments of the present disclosure is a device for eliminating background sound according to embodiments of the present disclosure. The device may be configured in any terminal device to perform background sound elimination on audio data to be processed.

The initial audio data set is an audio data set not containing background sound.

At block 102, background sound fusion processing is performed on the initial audio data set to obtain training sample data.

The background sound may include voice of a user, sound of steps, collision sound of objects, music, sound of vehicles, and the like.

In detail, by performing fusion processing on the initial audio data set and the background sound, the training sample data containing the initial audio data set and the background sound is obtained.

At block 103, neural network training is performed based on the training sample data and the initial audio data set to generate an initial neural network model for eliminating background sound.

The neural network may be any type of neural networks, such as a recurrent neural network, a convolutional neural network, a deep neural network, or the like. Correspondingly, the initial neural network model may be any type of neural network models, such as a recurrent neural network model, a convolutional neural network model, a deep neural network model, or the like.

It should be noted that, when performing the background sound fusion processing on the initial audio data set, the more the types of the background sounds and the more the number of pieces of audio data included in the training sample data and the initial audio data set are, the better the performance of the initial neural network model for eliminating background sound is. Therefore, in embodiments of the present disclosure, training sample data may be obtained by performing fusion processing on plentiful of background sound and the initial audio data, the neural network may be trained by using plentiful of training sample data and the initial audio data set.

Figure 2:
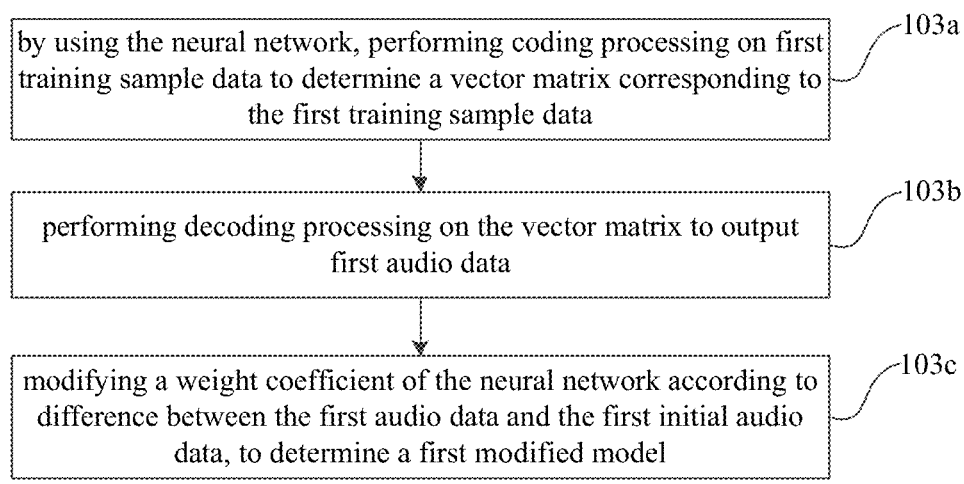
FIG. 2 is a flow chart of a method for eliminating background sound according to another embodiment of the present disclosure.

In detail implementation, a following way may be used. The neural network training is performed based on the training sample data and the initial audio data set to generate the initial neural network model for eliminating background sound, including followings as illustrated in FIG. 2.

At block 103a, by using the neural network, coding processing is performed on first training sample data to determine a vector matrix corresponding to the first training sample data.

The first training sample data is training sample data obtained by performing the background sound fusion processing on first initial audio data. Similarly, second training sample data is training sample data obtained by performing the background sound fusion processing on second initial audio data. The first initial audio data and the second initial audio data are any initial audio data in the initial audio data set.

At block 103b, decoding processing is performed on the vector matrix to output first audio data.

At block 103c, a weight coefficient of the neural network is modified according to difference between the first audio data and the first initial audio data, to determine a first modified model.

It should be understood that, performing coding processing on the first training sample data by using the neural network refers to processing the feature vector corresponding to the first training sample data by using the neural network.

In detail implementation, the weight coefficient of the neural network may be preset, after the feature vector corresponding to the first training sample data is input to the neural network, the first audio data may be generated by coding the first training sample data and decoding the generated feature matrix.

By comparing the first audio data and the first initial audio data, the first modifying coefficient may be determined according to the difference between the first audio data and the first initial audio data, thus the preset weight coefficient is modified according to the first modified coefficient to determine the first modified model.

Then, the feature vector corresponding to the second training sample data is input to the neural network, the second audio data may be generated by coding the second training sample data and decoding the generated feature matrix.

By comparing the second audio data and the second initial audio data, the second modified coefficient may be determined according to the difference between the second audio data and the second initial audio data, thus the modified weight coefficient is further modified according to the second modifying coefficient to determine the second modified model.

Repeat above process, by using plentiful of training sample data and the initial audio data set, the neural network is modified several times, and a final weight coefficient is determined, and the initial neural network model for eliminating background sound is generated.

At block 104, background sound elimination is performed on audio data to be processed based on the initial neural network model for eliminating background sound.

In detail, the audio data to be processed includes background audio data and audio data to be recognized not including the background audio data. The audio data to be processed is input to the initial neural network for eliminating background sound, and the audio data to be recognized not including the background audio data is obtained.

It should be noted that, after background sound elimination is performed on the audio data to be processed by using the initial neural network model, a type obtained may be any type of the audio data to be recognized. For example, feature vector corresponding to the audio data to be recognized may be obtained.

That is, the step at block 104 may include follows.

Background sound elimination is performed on the audio data to be processed to determine a feature vector corresponding to the audio data to be recognized.

That is, the feature vector corresponding to the audio data to be processed is firstly obtained. Then the feature vector corresponding to the audio data to be processed is input to the initial neutral network model to obtain the feature vector corresponding to the audio data to be recognized.

The feature vector may be a Mel-frequency cepstral coefficient, a linear predication coefficient, and the like.

With the method for eliminating background sound according to embodiments of the present disclosure, after obtaining the initial audio data set, the background sound fusion processing is firstly performed on the initial audio data set to obtain training sample data, then neural network training is performed based on the training sample data and the initial audio data set to generate the initial neural network model for eliminating background sound, and finally, background sound elimination is performed on audio data to be processed based on the initial neural network model for eliminating background sound. Thereby, it realizes eliminating background sound of the audio data to be processed by using the neural network model, improving calling quality. In addition, when the user is in a different scenario, no separate training is required to generate the neural network model, the implementation is simple, with low cost, and user experience is improved.

It can be known from above analysis that, background sound elimination processing may be performed on the audio data to be processed by using the trained initial neural network model for eliminating background sound, to generate the audio data to be recognized not including the background sound. In a possible implementation, the audio data to be recognized may be recognized. In the following, the method for eliminating background sound according to an embodiment of the present disclosure will be further described in combination with FIG. 3.

Figure 3:
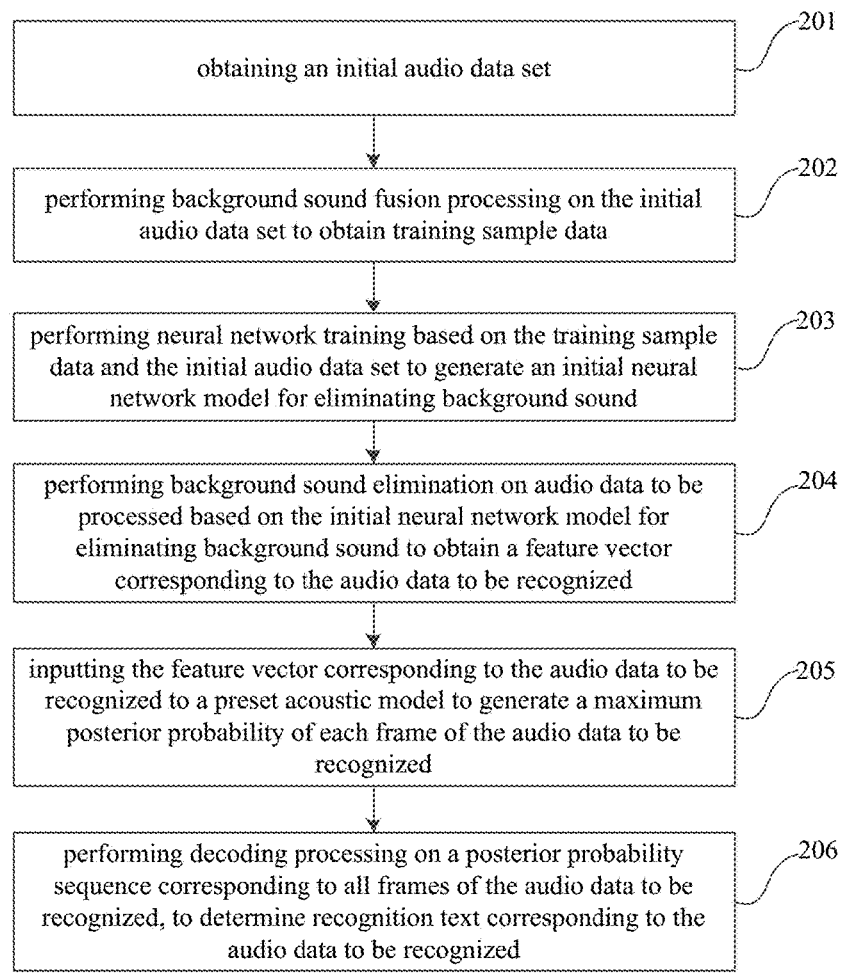
FIG. 3 is a flow chart of a method for eliminating background sound according to another embodiment of the present disclosure.

FIG. 3 is a flow chart of a method for eliminating background sound according to another embodiment of the present disclosure.

As illustrated in FIG. 3, the method includes follows.

At block 201, an initial audio data set is obtained.

At block 202, background sound fusion processing is performed on the initial audio data set to obtain training sample data.

At block 203, neural network training is performed based on the training sample data and the initial audio data set to generate an initial neural network model for eliminating background sound.

At block 204, background sound elimination is performed on audio data to be processed based on the initial neural network model for eliminating background sound to obtain a feature vector corresponding to the audio data to be recognized.

For detail implementation process and principle of the above steps at block 201-204, reference may be made to detailed description in above embodiments, which is not elaborated herein.

It should be noted that, to improve quality of the initial neural network model, in embodiments of the present disclosure, after generating the initial neural network model for eliminating background sound, training may further be performed on the initial neural network model, to improve performance of the initial neural network model.

That is, after the step at block 204, the method may further include follows.

Update training is performed on the initial neural network model to generate an updated neural network model.

In detail, during applying the initial neural network model, training sample data different from the training sample data used for training the initial neural network model is used to further train the initial neural network, so as to update the initial neural network and to generate updated neural network.

At block 205, the feature vector corresponding to the audio data to be recognized is input to a preset acoustic model to generate a maximum posterior probability of each frame of the audio data to be recognized.

The acoustic model may be any model such as a neural network. In detail, the acoustic model may be a deep neural network, a recurrent neural network, a convolutional neural network, or the like.

In detail, by inputting the feature vector corresponding to the audio data to be recognized to the preset acoustic model for computation, the maximum posterior probability of each frame of the audio data to be recognized may be obtained. A specific implementation for obtaining the maximum posterior probability of each frame of the audio data to be recognized may be any way for generating the maximum posterior probability of each frame of the audio data to be recognized in the related art, which is not limited herein.

At block 206, decoding processing is performed on a posterior probability sequence corresponding to all frames of the audio data to be recognized, to determine recognition text corresponding to the audio data to be recognized.

In detail, performing decoding processing on the posterior probability sequence corresponding to all frames of the audio data to be recognized may be obtaining an optimal word string via a design algorithm to determine the recognition text corresponding to the audio data to be recognized. The design algorithm may be Viterbi algorithm, or the like, which is not limited herein.

It should be noted that, in embodiments of the present disclosure, before the decoding processing is performed on the posterior probability sequence corresponding to all frames of the audio data to be recognized, compression smoothing processing may be performed on the maximum posterior probability of each frame of the audio data to be recognized, such that the processed maximum posterior probability of each frame of the audio data to be recognized is more smooth, and fluctuation range of the processed maximum posterior probability of each frame is smaller than fluctuation range of the maximum posterior probability not processed of each frame.

In detail, the compression smoothing processing may be performed in many ways.

For example, the compression smoothing processing may be performed in a way of function transformation. For example, by using a function that satisfies a certain characteristic, the maximum posterior probability of each frame of the audio data to be recognized is used as a parameter to perform transformation, and the maximum posterior probability after data processing of each frame is obtained.

Alternatively, performing the compression smoothing processing on the maximum posterior probability of each frame of the audio data to be recognized may be realized by a way of image processing. For example, the maximum posterior probability of each frame of the audio data to be recognized is drawn in a Cartesian coordinate system, forming a scatter diagram, a line chart, a curve graph, or the like. Then image processing is performed on the scatter diagram, the line chart, the curve graph, or the like, to obtain a distribution diagram having smoother distribution and a smaller fluctuation range than the fluctuation range before the processing, and the maximum posterior probability of each frame of the audio data to be recognized is obtained according to the distribution diagram.

Above examples for performing the compression smoothing processing are merely exemplary descriptions, which should be not understood to limit technical solutions of the present disclosure. Based on this, those skilled in the art may perform the compression smoothing processing in any ways as needed, which is not limited herein.

With the method for eliminating background sound according to embodiments of the present disclosure, the initial audio data set is firstly obtained, then the background sound fusion processing is performed on the initial audio data set to obtain training sample data, the neural network training is performed based on the training sample data and the initial audio data set to generate the initial neural network model for eliminating background sound, background sound elimination is performed on audio data to be processed based on the initial neural network model for eliminating background sound to obtain the feature vector corresponding to the audio data to be recognized, then the feature vector corresponding to the audio data to be recognized is input to the preset acoustic model to generate the maximum posterior probability of each frame of the audio data to be recognized, and finally, the decoding processing is performed on the posterior probability sequence corresponding to all frames of the audio data to be recognized, to determine recognition text corresponding to the audio data to be recognized. Thereby, it realizes eliminating background sound of the audio data to be processed by using the neural network model and recognition of the audio data after the background sound elimination, improving calling quality. In addition, when the user is in a different scenario, no separate training is required to generate the neural network model, the implementation is simple, with low cost, and user experience is improved.

Figure 4:
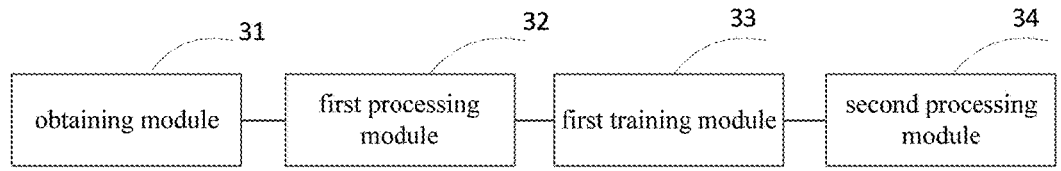
FIG. 4 is a block diagram of a device for eliminating background sound according to an embodiment of the present disclosure.

FIG. 4 is a block diagram of a device for eliminating background sound according to an embodiment of the present disclosure.

As illustrated in FIG. 4, the device for eliminating background sound includes an obtaining module 31, a first processing module 32, a first training module 33, and a second processing module 34.

An obtaining module 31 is configured to obtain an initial audio data set.

A first processing module 32 is configured to perform background sound fusion processing on the initial audio data set to obtain training sample data.

A first training module 33 is configured to perform neural network training based on the training sample data and the initial audio data set to generate an initial neural network model for eliminating background sound.

A second processing module 34 is configured to perform background sound elimination on audio data to be processed based on the initial neural network model for eliminating background sound.

In detail, the device for eliminating background sound provided in embodiments of the present disclosure may implement the method for eliminating background sound provided in embodiments of the present disclosure. The device may be configured in any terminal device to perform the background sound elimination on the audio data to be processed.

In a possible implementation of embodiments of the present disclosure, the audio data to be processed comprises background audio data and audio data to be recognized, the above second processing module 34 is configured to perform background sound elimination on the audio data to be processed to obtain a feature vector corresponding to the audio data to be recognized.

It should be noted that, the above-mentioned explanation of embodiments of the method for eliminating background sound is suitable for implementing embodiments of the device method for eliminating background sound, which is not elaborated herein.

With the device for eliminating background sound according to embodiments of the present disclosure, after obtaining the initial audio data set, the background sound fusion processing is firstly performed on the initial audio data set to obtain the training sample data, then the neural network training is performed based on the training sample data and the initial audio data set to generate the initial neural network model for eliminating background sound, and finally, background sound elimination is performed on the audio data to be processed based on the initial neural network model for eliminating background sound. Thereby, it realizes eliminating background sound of the audio data to be processed by using a neural network model, improving calling quality. In addition, when the user is in a different scenario, no separate training is required to generate the neural network model, the implementation is simple, with low cost, and user experience is improved.

Figure 5:
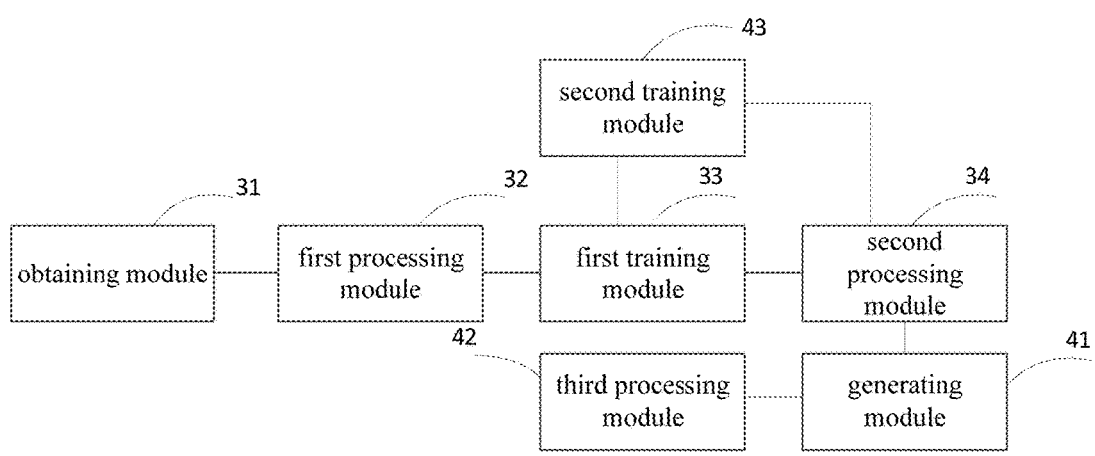
FIG. 5 is a block diagram of a device for eliminating background sound according to another embodiment of the present disclosure.

FIG. 5 is a block diagram of a device for eliminating background sound according to another embodiment of the present disclosure.

As illustrated in FIG. 5, the device for eliminating background sound further includes a generating module 41, a third processing module 42, and a second training module 43 based on FIG. 4.

The generating module 41 is configured to input the feature vector corresponding to the audio data to be recognized to a preset acoustic model to generate a maximum posterior probability of each frame of the audio data to be recognized.

The third processing module 42 is configured to perform decoding processing on a posterior probability sequence corresponding to all frames of the audio data to be recognized, to determine recognition text corresponding to the audio data to be recognized.

The second training module 43 is configured to perform update training on the initial neural network model to generate an updated neural network model.

It should be noted that, the above-mentioned explanation of embodiments of the method for eliminating background sound is suitable for implementing embodiments of the device method for eliminating background sound, which is not elaborated herein.

With the device for eliminating background sound according to embodiments of the present disclosure, the initial audio data set is firstly obtained, then the background sound fusion processing is performed on the initial audio data set to obtain training sample data, the neural network training is performed based on the training sample data and the initial audio data set to generate the initial neural network model for eliminating background sound, background sound elimination is performed on audio data to be processed based on the initial neural network model for eliminating background sound to obtain the feature vector corresponding to the audio data to be recognized, then the feature vector corresponding to the audio data to be recognized is input to the preset acoustic model to generate the maximum posterior probability of each frame of the audio data to be recognized, and finally, the decoding processing is performed on the posterior probability sequence corresponding to all frames of the audio data to be recognized, to determine recognition text corresponding to the audio data to be recognized. Thereby, it realizes eliminating background sound of the audio data to be processed by using the neural network model and recognition of the audio data after the background sound elimination, improving calling quality. In addition, when the user is in a different scenario, no separate training is required to generate the neural network model, the implementation is simple, with low cost, and user experience is improved.

To achieve above objectives, embodiments of a third aspect of the present disclosure provide a terminal device including: a memory, a processor and a computer program executable on the processor and stored on the memory, when executed by the processor, causing the processor to implement the method for eliminating background sound according to any one of above embodiments of the present disclosure.

To achieve above objectives, embodiments of a fourth aspect of the present disclosure provide a non-transitory computer readable storage medium, having a computer program thereon, wherein the computer program is configured to implement the method for eliminating background sound according to any one of above embodiments of the present disclosure.

To achieve above objectives, embodiments of a fifth aspect of the present disclosure provide a computer program product, when instructions in the computer program product is executed by the processor, the method for eliminating background sound according to any one of above embodiments of the present disclosure is implemented.

Reference throughout this specification to "one embodiment", "some embodiments," "an example", "a specific example," or "some examples," means that a particular feature, structure, material, or characteristic described in connection with the embodiment or example is included in at least one embodiment or example of the present disclosure. In this specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, like two or three, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of an embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for eliminating background sound on a terminal device comprising: obtaining, with a processor, an initial audio data set from the terminal device; performing, with the processor, background sound fusion processing on the initial audio data set to obtain training sample data;

performing, with the processor, neural network training based on the training sample data and the initial audio data set to generate an initial neural network model for eliminating background sound; and performing, with the processor, background sound elimination on audio data to be processed based on the initial neural network model for eliminating background sound; wherein the audio data to be processed comprises background audio data and audio data to be recognized, performing, with the processor, background sound elimination on audio data to be processed comprises: performing, with the processor, background sound elimination on the audio data to be processed to obtain a feature vector corresponding to the audio data to be recognized; inputting, with the processor, the feature vector corresponding to the audio data to be recognized to a preset acoustic model to generate a maximum posterior probability of each frame of the audio data to be recognized; and performing, with the processor, decoding processing on a posterior probability sequence corresponding to all frames of the audio data to be recognized, to determine recognition text corresponding to the audio data to be recognized; wherein performing decoding processing on the posterior probability sequence comprises: obtaining, with the processor, an optimal word string to determine the recognition text corresponding to the audio data to be recognized.

2. The method according to claim 1, after generating the initial neural network model for eliminating background sound, further comprising:
performing update training on the initial neural network model to generate an updated neural network model.

3. A terminal device, comprising:
a memory, a processor and a computer program executable on the processor and stored on the memory, when executed by the processor, causing the processor to implement a method for eliminating background sound, wherein the method comprises:
obtaining an initial audio data set;
performing background sound fusion processing on the initial audio data set to obtain training sample data;
performing neural network training based on the training sample data and the initial audio data set to generate an initial neural network model for eliminating background sound; and
performing background sound elimination on audio data to be processed based on the initial neural network model for eliminating background sound;
wherein the audio data to be processed comprises background audio data and audio data to be recognized, performing background sound elimination on audio data to be processed comprises:
performing background sound elimination on the audio data to be processed to obtain a feature vector corresponding to the audio data to be recognized;
inputting the feature vector corresponding to the audio data to be recognized to a preset acoustic model to generate a maximum posterior probability of each frame of the audio data to be recognized; and
performing decoding processing on a posterior probability sequence corresponding to all frames of the audio data to be recognized, to determine recognition text corresponding to the audio data to be recognized;
wherein performing decoding processing on the posterior probability sequence comprises: obtaining an optimal word string via a design algorithm to determine the recognition text corresponding to the audio data to be recognized.

4. The terminal device according to claim 3, after generating the initial neural network model for eliminating background sound, the method further comprising:
performing update training on the initial neural network model to generate an updated neural network model.

5. A non-transitory computer readable storage medium, having a computer program thereon, wherein the computer program is configured to implement a method for eliminating background sound, comprising:
obtaining an initial audio data set;
performing background sound fusion processing on the initial audio data set to obtain training sample data;
performing neural network training based on the training sample data and the initial audio data set to generate an initial neural network model for eliminating background sound; and
performing background sound elimination on audio data to be processed based on the initial neural network model for eliminating background sound;
wherein the audio data to be processed comprises background audio data and audio data to be recognized, performing background sound elimination on audio data to be processed comprises:
performing background sound elimination on the audio data to be processed to obtain a feature vector corresponding to the audio data to be recognized;
inputting the feature vector corresponding to the audio data to be recognized to a preset acoustic model to generate a maximum posterior probability of each frame of the audio data to be recognized; and
performing decoding processing on a posterior probability sequence corresponding to all frames of the audio data to be recognized, to determine recognition text corresponding to the audio data to be recognized;
wherein performing decoding processing on the posterior probability sequence comprises: obtaining an optimal word string to determine the recognition text corresponding to the audio data to be recognized.

6. The storage medium according to claim 5, after generating the initial neural network model for eliminating background sound, the method further comprising:
performing update training on the initial neural network model to generate an updated neural network model.

* * * * *